4 Sheets—Sheet 1.

F. E. YOUNG.

SURGICAL CHAIR.

No. 10,761. Reissued Aug. 24, 1886.

WITNESSES

Harry Frease

Joseph Frease.

INVENTOR

Franklin E. Young

Fred W. Cooke

By Attorney

F. E. YOUNG.
SURGICAL CHAIR.
No. 10,761. Reissued Aug. 24, 1886.
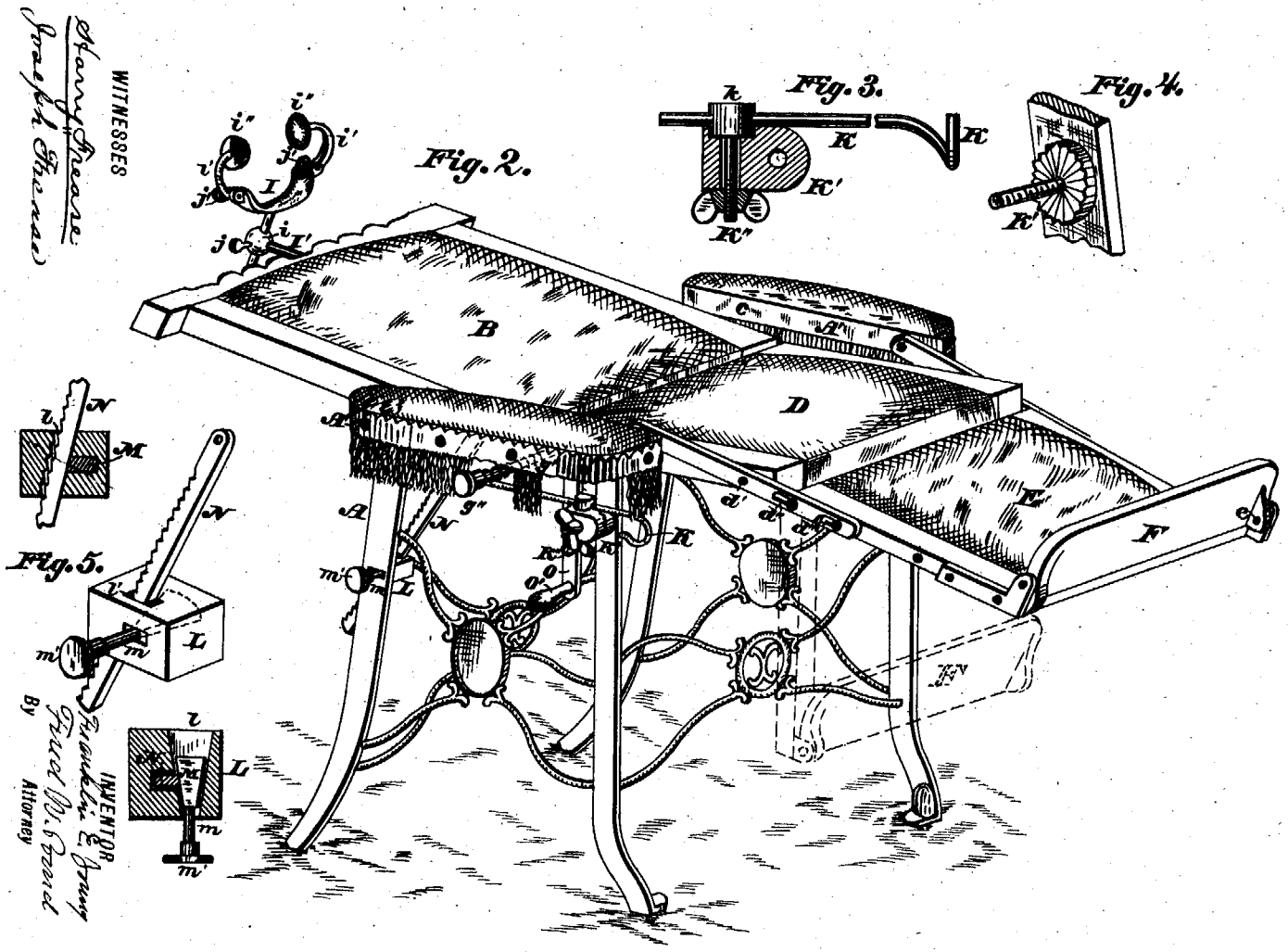

F. E. YOUNG.

SURGICAL CHAIR.

No. 10,761. Reissued Aug. 24, 1886.

WITNESSES

Harry Frease

Joseph Frease

INVENTOR

Franklin E. Young

By Fred N. Bond

Attorney

F. E. YOUNG.

SURGICAL CHAIR.

No. 10,761. Reissued Aug. 24, 1886.

WITNESSES

Harry Frease

Joseph Frease.

Franklin E. Young INVENTOR

Fred W. Bond

By Attorney

UNITED STATES PATENT OFFICE.

FRANKLIN E. YOUNG, OF CANTON, OHIO.

SURGICAL CHAIR.

SPECIFICATION forming part of Reissued Letters Patent No. 10,761, dated August 24, 1886.

Original No. 289,743, dated December 4, 1883. Application for reissue filed November 6, 1885. Serial No. 182,373.

*To all whom it may concern:*

Be it known that I, FRANKLIN E. YOUNG, a citizen of the United States, residing at Canton, in the county of Stark and State of Ohio, have invented certain new and useful Improvements in Surgical Chairs, of which the following is a specification, reference being had therein to the accompanying drawings.

This invention relates to certain new and useful improvements in that class of chairs used for surgical purposes that will admit of easy adjustment to the various positions necessary for examinations or special operations upon the patient, all of which will be hereinafter more particularly described, and pointed out in the claims.

Figures 1, 1A:
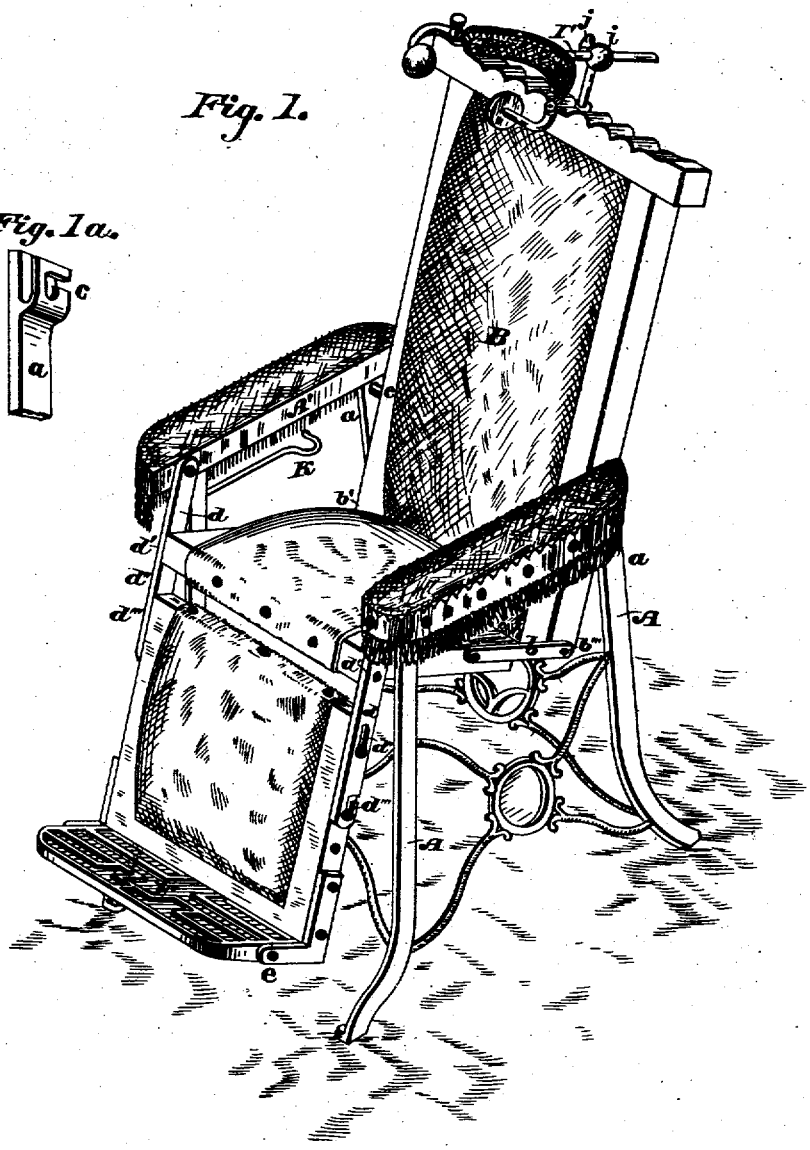
Figure 8:
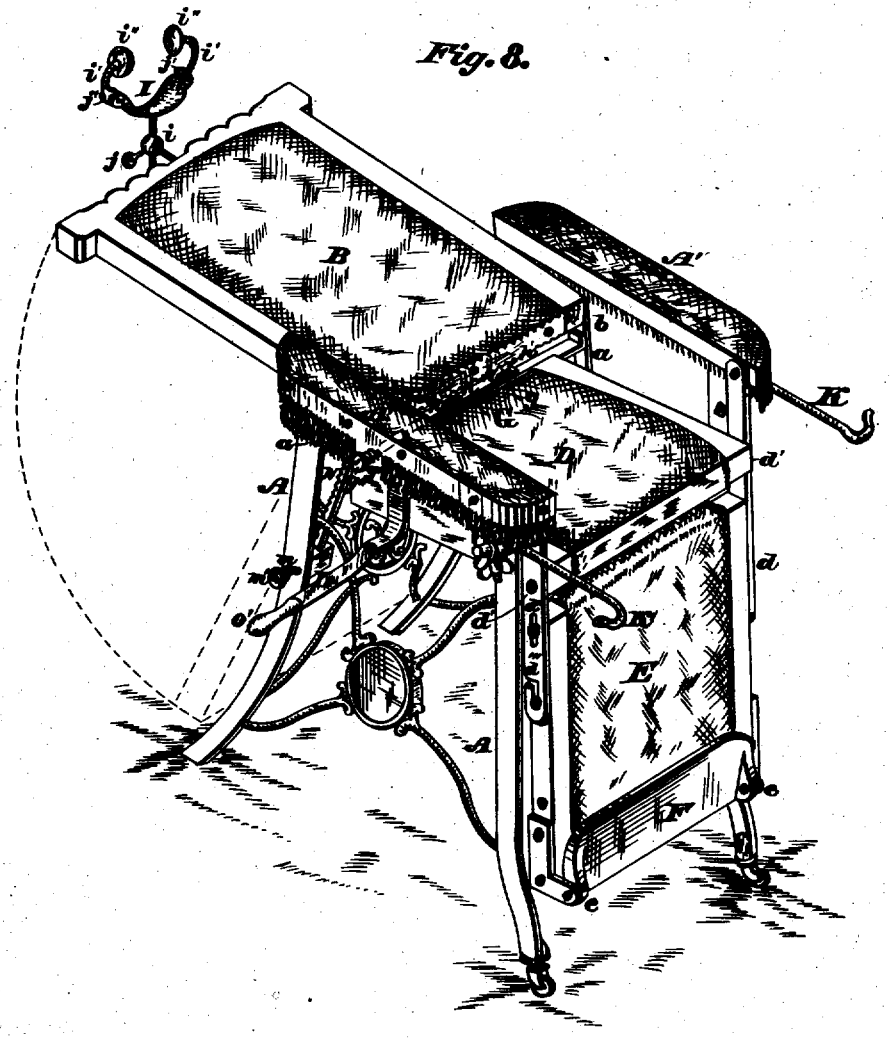
Figure 6:
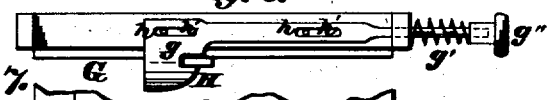
Figure 7:
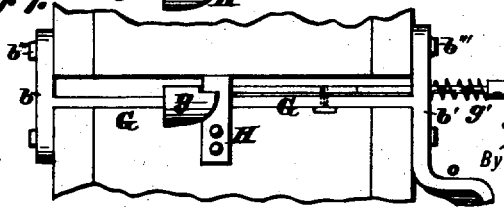
Figure 9:
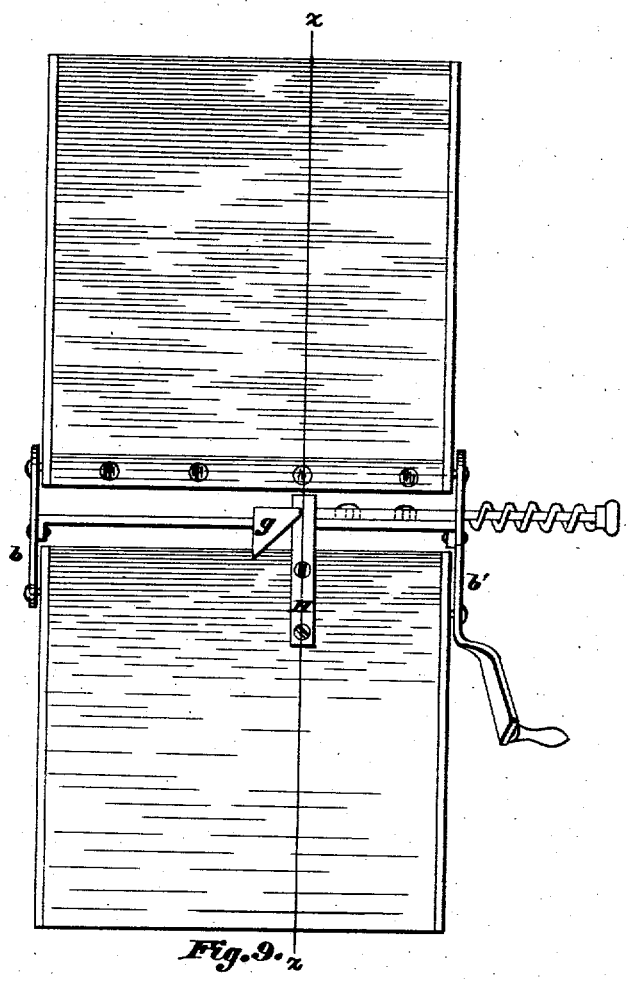
Figure 10:
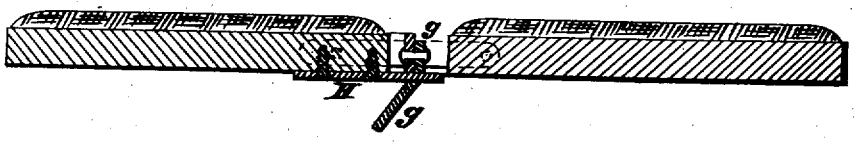

In the accompanying drawings, forming part of this specification, there are four sheets, in which Figure 1 is a perspective view of the chair in one position as in ordinary use for sitting. Fig. 2 represents the chair extended and in a horizontal position, the seat elevated to a level with the arms. Figs. 3 and 4 are details of the clamp for securing the stirrup in any position. Fig. 5 represents details of the device for clamping and holding the back at any angle. Figs. 6 and 7 are detail views of the devices for locking and unlocking the seat. Fig. 8 is a perspective view of the chair in another position, with the back horizontal, the seat lowered, and the leg-rest dropped from the position shown in Fig. 2. Fig. 9 is an underneath view of the back and seat detached from the frame, showing the apparatus for coupling and uncoupling the back and seat. Fig. 10 is a transverse section of Fig. 9 on line *z z*.

A represents the frame of the chair, which can be made of any suitable material and substantial and weighty enough to stand firmly upon the floor. The feet may be so constructed as to admit of being secured to the floor. The arms A′ are permanently fastened to the upper ends of the standards or legs of the chair, and are covered with upholstery to form comfortable cushions on top.

B is the back of the chair, which is properly framed and upholstered. It is attached to the hind legs, *a a*, by pivots C, about six inches from the lower end, which fit into angular sockets *c*, forming part of the back legs or standards, *a a*, as seen in Fig. 1*, Sheet 1. The back is also connected to the seat D at the lower end by links or narrow plates of metal *b b′*, which serve as hinges. The link *b* on one side (seen in Fig. 1) is straight. Link *b′* (seen in Figs. 2, 7, and 8) is continued and curved so that it acts as a strap by means of its connection with the back and seat, and is also a lever, O, having a handle, O′, as will be hereinafter explained.

The seat D is supported at the front upon the metallic straps *d d* on the sides of the leg-rest E by a pivot-joint, *d′*. The straps *d d* are also pivoted to the chair-frame A at their upper ends inside of each arm-rest A′, and they are provided with two slots, *d″* and *d‴*. The lower slot, *d‴*, is made open to let the bolt of the leg-rest drop out when the operator desires the leg-rest to drop from the horizontal to a perpendicular position, as seen in the broken lines, Fig. 2.

The leg-rest E has attached to it a foot-board, F, which is pivoted or hinged at *e*, so that it may be turned, as shown in Fig. 8. At the back end of the seat D the straps *b* and *b′* are also pivoted to it, as they are to the lower end of the back B. These straps *b b′* are united by a cross-bar, G, as seen in Figs. 6 and 7, which bar G has on it a sliding hook, *g*, that engages with a catch-plate, H, secured to the bottom of seat D.

The sliding hook or locking-catch *g* is operated by the spiral spring *g′* and the knob *g″* on the outer end, and which is held on the bar G by the pins *h h* in the slots *h′ h′* when it is desired. The sliding hook *g* fastens the side links or plates, *b b′*, allowing motion only at the pivot *b‴* at the lower end of the back B until the hook is freed from the lock-plate H, when the seat D and the leg-rest E will resume their position, as seen in Fig. 8, while the back B will remain in a horizontal position or at any inclination which may be required.

The head-rest I is shown in detail in Fig. 2. I′ is a socket-iron fastened to the rear of back B, having on it a ball, *i*, and thumb-screw *j*, to adjust and support the head-rest I at any elevation.

*i′ i′* are curved clamps provided at their ends with cushioned pads *i″ i″*, and which can be secured by clamp-screws *j′ j′*, provided with corrugated or serrated surfaces, as illustrated in Fig. 4. These clamps are used to hold the head firmly in operations of a delicate nature upon the eyes or throat, serving thereby the purpose of an assistant and in a better manner.

The head-rest and its clamps for securing it and holding the head will form the subject-matter of a future application.

The stirrups K are made hook shape on the ends of iron rods pivoted under the arms A′ to the front legs or standards in the heads of bolts *k*, passing through the clamp K′, which has on the interior faces serrated or corrugated surfaces, as shown in Fig. 4, and which are secured together by clamp-screws K′, and the stirrup-rod is fastened by a clamp-screw, K″, Fig. 3. When the stirrups are not in use, they are turned under the arm-rests, as seen in Fig. 1. In Fig. 5 is shown the device for clamping and holding the bar N, which sustains the back B at any angle with the seat D and the leg-rest E when they are locked together.

L is a block secured to the hind leg of the chair-frame A, in which block is a horizontal dovetail mortise, *l*, and a vertical rectangular mortise, *l′*, having dentations or corrugations upon one side of the mortise. A dovetailed plug, M, having a stem, *m*, and knob *m′*, is fitted to mortise *l*, and a dentated rod, N, of rectangular cross-section is fitted to the mortise *l′*, having one side dentated or corrugated to correspond with the side of mortise *l′*. By pulling out the knob *m′* the rod N can be secured to the block at any elevation required. By pushing in the knob *m′* the rod N will be released, and it can be moved up or down, as may be desired.

In the treatment of rectal and uterine diseases in the back positions it is necessary to have the patient's hips at the edge of the bed, table, or chair-seat, and, as it is inconvenient and embarrassing to lift the patient into proper position, it becomes desirable to avoid that, and these difficulties are entirely overcome by this device.

When a patient is placed in a horizontal position in the chair, as it is represented in Fig. 2, the feet are to be placed in the stirrups K K. The knob *m′* is then to be shoved in with the left hand, and with the right hand on the handle O′, attached to the crank part O of the lever-strap *b′*, let down the seat D and leg-rest E, as seen in Fig. 8. This leaves the patient in the proper position, with the hips resting on the lower end of the back B, without being lifted forward. The seat D is then convenient to place on it a basin or instruments. The foot-board F is then turned back out of the way, as in Fig. 8, and the operator sits down in front of his work, and in this way the chair is adapted to the patient instead of adapting the patient to the chair, and it also gives the most favorable position with the greatest facility and the least embarrassment and exposure.

To get the patient out of the last-described position, bring up the seat D and leg-rest E, by means of the handle O′ and lever O of strap *b′*, until the released hook *g* catches the plate H; place the feet upon the leg-rest E. Then the patient can easily come to the sitting posture and the back B will follow, and the chair be again as in Fig. 1.

To attain either the right or left lateral positions, place the patient in the horizontal position, as heretofore described and as illustrated in Fig. 2; turn the patient on the side with the hip on the arm of the chair. Then drop the leg-rest E out of the way. This is done by pushing it until the sustaining-bolts drop out of the slots *d‴*, when by its own weight it will assume the vertical position, as in broken lines in Fig. 2 and solid lines in the other figures.

When the chair is to be folded for transportation, the back B is lifted out of the bearings *c c* and turned down, as shown in dotted lines in Fig. 8. The seat D is let down, and leg-rest E, with foot-board F, are all as represented in that figure, and the stirrups turned under the arm-rests. The chair is then prepared to be placed in a box or case, as may be desired.

Having described my invention, what I desire to secure by Letters Patent is—

1. The combination, with the supporting-frame, of the back pivoted thereto, a seat pivoted at its front end to the frame, substantially as described, links pivoted to the seat and back, and means, substantially as set forth, for connecting the links rigidly with the back end of the seat and disconnecting them, as and for the purposes set forth.

2. The combination of the supporting-frame, the back B, pivoted to the frame, the seat D, pivoted at its front to the frame, substantially as described, having the lock-plate H, the side straps, *b b′*, pivoted to the back and seat, as set forth, the bar G, secured to the straps *b b′* and locking-catch *g*, and the handle O O′, attached to the side strap, *b′*, substantially as and for the purpose described.

3. The combination of the pivoted back B and links *b b′* with the suspended seat D and links *d d*, whereby the seat may be elevated with the back or dropped below it, substantially as specified.

4. The combination of the back B and links *b b′*, coupled together by the bar or locking-catch *g* H with the seat D, substantially as and for the purpose set forth.

In testimony that I claim the above I have hereunto subscribed my name in the presence of two witnesses.

FRANKLIN E. YOUNG.

Witnesses:
FRED. W. BOND,
HARRY FREASE.